United States Patent
Lin et al.

(10) Patent No.: US 6,603,849 B2
(45) Date of Patent: *Aug. 5, 2003

(54) SYSTEM AND METHOD FOR CALL RE-DIRECTION IN H.323 NETWORK

(75) Inventors: Janette Chen Lin, Dallas, TX (US); Sridhar Kolar, Richardson, TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,323

(22) Filed: Aug. 20, 1999

(65) Prior Publication Data

US 2003/0128831 A1 Jul. 10, 2003

(51) Int. Cl.⁷ .................... H04M 7/00; H04M 1/64; H04M 3/42; H04L 12/66; H04J 3/16
(52) U.S. Cl. ................ 379/221.01; 379/88.21; 370/356; 370/352; 370/467; 455/417
(58) Field of Search .............. 455/417; 370/401, 370/352, 467, 356; 379/219, 221.01, 88.21

(56) References Cited

U.S. PATENT DOCUMENTS

| | | | | |
|---|---|---|---|---|
| 5,311,574 A | * | 5/1994 | Livanos | 379/88.21 |
| 6,125,123 A | * | 9/2000 | Furuno | 370/467 |
| 6,128,304 A | * | 10/2000 | Gardell et al. | 370/401 |
| 6,185,288 B1 | * | 2/2001 | Wong | 379/219 |
| 6,201,805 B1 | * | 3/2001 | Strathmeyer | 370/356 |
| 6,259,691 B1 | * | 7/2001 | Naudus | 370/352 |
| 6,314,284 B1 | * | 11/2001 | Patel et al. | 455/417 |

* cited by examiner

Primary Examiner—Ahmad F. Matar
Assistant Examiner—Thjuan P Knowlin
(74) Attorney, Agent, or Firm—Jenkens & Gilchrist, P.C.

(57) ABSTRACT

A telecommunications system and method is disclosed for re-directing failed calls to H.323 endpoints within an H.323 system by adding a unique re-routing release cause to a Release Complete message in the H.225 protocol that indicates that the call should be re-routed to another number. The Gatekeeper within the H.323 system stores the alternative number for the H.323 endpoint, and upon reception of this new re-routing cause in the Release Complete message, the Gatekeeper establishes a new leg of call to the alternative number.

20 Claims, 6 Drawing Sheets

SYSTEM AND METHOD FOR CALL RE-DIRECTION IN H.323 NETWORK

BACKGROUND OF THE PRESENT INVENTION

1. Field of the Invention

The present invention relates generally to H.323 telecommunications networks, and specifically to call routing within an H.323 network.

2. Background of the Present Invention

Local Area Networks (LANs) not only interconnect computers for data communications, but can also interconnect terminals (hereinafter termed endpoints) for voice communications. For example, many LANs are now implementing H.323 architecture to provide multimedia communications services over LANs. H.323 endpoints may be integrated into personal computers, implemented in stand-alone devices, such as wireline or wireless telephones or implemented in wireless telecommunications systems. H.323 endpoints can provide real-time audio, video and/or data communications capabilities in point-to-point or multipoint conferences.

Within an H.323 system, each H.323 endpoint is registered with a Gatekeeper for the H.323 system. The Gatekeeper stores an Internet Protocol (IP) address for the H.323 endpoint, so that when a connection to that H.323 endpoint is requested, the Gatekeeper knows how to route the connection. If the H.323 endpoint is a Mobile Station (MS), such as a cellular telephone, the IP address for the MS typically includes the IP address for a Mobile Switching Center (MSC) serving the MS along with a specific port number for that MS. Therefore, although each MS has a separate subscriber record within the Gatekeeper, each MS has the same IP address, e.g., the IP address of the MSC. In addition to the routing information, the Gatekeeper also stores the permanent subscriber information for the MS.

The protocol used by the Gatekeeper to communicate with the H.323 endpoints for call control purposes is the H.225 protocol. Today, if a call to an H.323 endpoint needs to be re-directed from that H.323 endpoint to another H.323 endpoint or to a terminal outside the H.323 system, the H.225 protocol uses a Facility message to handle re-direction of the call. However, the Facility message requires the H.323 endpoint originally receiving the call to know the new number (IP address for the other H.323 endpoint or directory number for the other terminal) in order to re-direct the call.

For example, when a call is originated to an MS within the H.323 system from a calling party outside of the H.323 system, the called party number for the called MS is typically an "office number" similar to a private branch exchange number that identifies the Gatekeeper of the H.323 system. Therefore, even if the MS has roamed outside of the H.323 system into the Public Land Mobile Network (PLMN), calls to the MS will still come into the Gatekeeper. Since the Gatekeeper only stores internal H.323 routing information, these calls will be routed to the MSC within the H.323 system that was previously serving the MS before the MS roamed outside of the H.323 system. However, since the MS 20 has roamed outside of the H.323 system, when the MSC attempts to page the MS, these paging attempts will fail.

In order to complete the call to the MS, the call must be re-directed to the PLMN. Although the MSC within the H.323 system could store the Mobile Station Integrated Services Digital Network (MSISDN) number of the MS, which is the number required by the PLMN to reach the MS, this is not a desirable or efficient solution. In order to re-route calls to the MS using the existing H.225 protocol, the MSC would have to store the MSISDN number of each MS that it serves and send this MSISDN number to the Gatekeeper in the Facility message.

SUMMARY OF THE INVENTION

The present invention is directed to telecommunications systems and methods for re-directing failed calls to H.323 endpoints within an H.323 system by adding a unique re-routing release cause to a Release Complete message in the H.225 protocol that indicates that the call should be re-routed to another number. The Gatekeeper stores the alternative number for the H.323 endpoint, and upon reception of this re-routing cause in the Release Complete message, the Gatekeeper establishes a new leg of call to the alternative number. Since the Gatekeeper already stores routing information for H.323 endpoints, the Gatekeeper has the capability to store alternative numbers as well. Storing the alternative number in the Gatekeeper furthers the functionality of the Gatekeeper in directing and re-directing calls in the H.323 system.

BRIEF DESCRIPTION OF THE DRAWINGS

The disclosed invention will be described with reference to the accompanying drawings, which show important sample embodiments of the invention and which are incorporated in the specification hereof by reference, wherein:.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
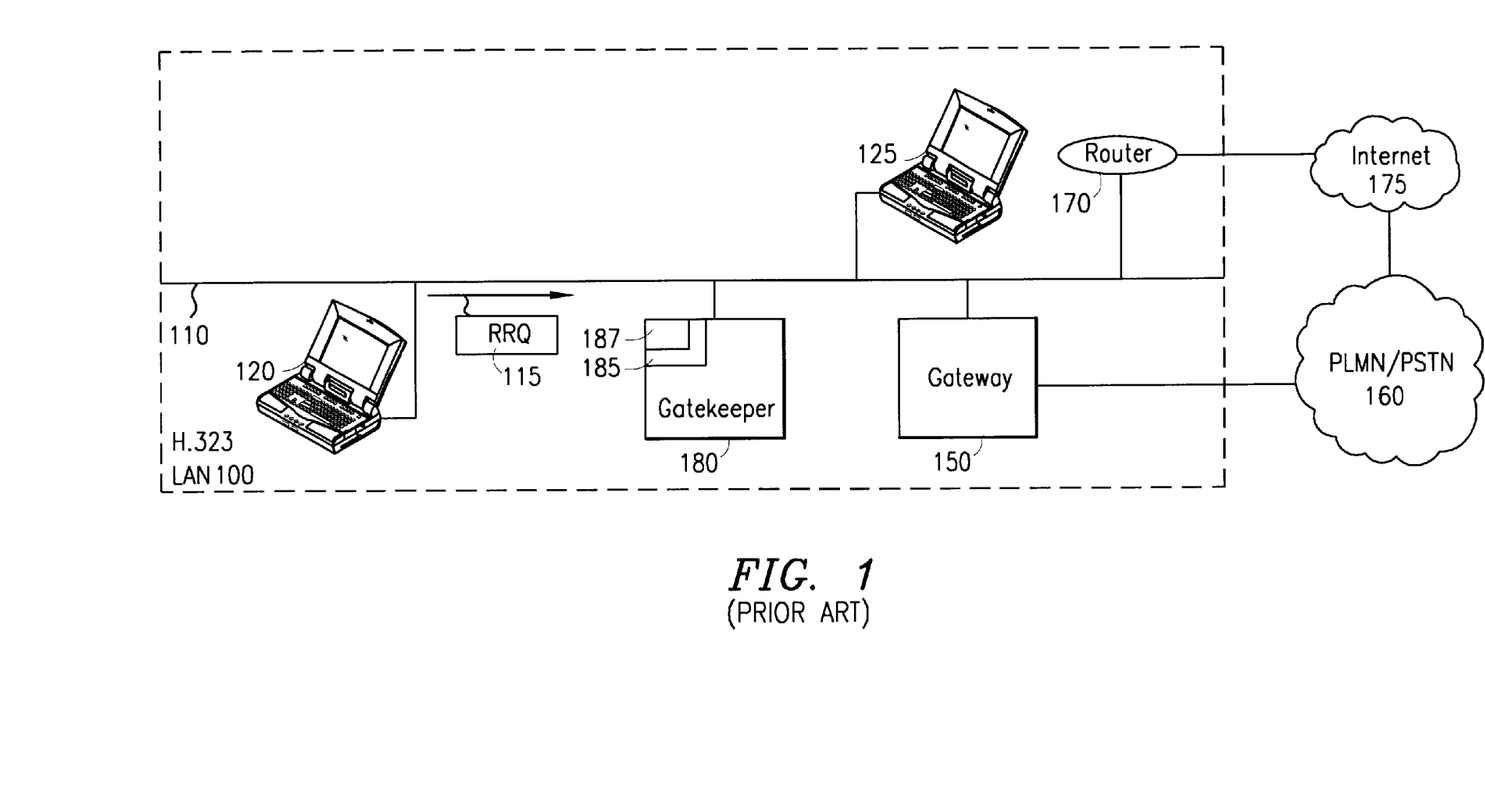
FIG. 1 is a block diagram illustrating a conventional H.323 system.

A sample H.323 system is shown in FIG. 1 of the drawings. When a first user logs-on to a first H.323 endpoint 120, which can be, for example, a personal computer or IP telephone, e.g., by providing a user name and password, an H.225 Registration Request (RRQ) message 115 is sent from the first H.323 endpoint 120 to a Gatekeeper 180. In response to the RRQ message 115, the Gatekeeper 180 stores an Internet Protocol (IP) routing address 187 within a subscriber record or database 185 for the first H.323 endpoint 120.

Thereafter, when a second user on a second H.323 endpoint 125 places a call to the first user on the first H.323 endpoint 120, e.g., by dialing a telephone number or entering a user ID for the first user, the call is routed over the LAN backbone 110 to the Gatekeeper 180, which retrieves the address 187 for the first H.323 endpoint 120 and routes the call to the first H.323 endpoint 120.

If the calling party is within the Public Land Mobile Network (PLMN)/Public Switched Telephone Network (PSTN) 160, the call is routed to the Gatekeeper 180 through a Gateway 150, and subsequently to the first H.323 endpoint 120. Voice and data are sent to and from the first H.323 endpoint 120 via the Gateway 150, which converts the voice and data between the IP and the PLMN/PSTN format. In addition, speech and data may be routed within the H.323 system 100 and through the Internet 175 via an IP Router 170.

Figure 2:
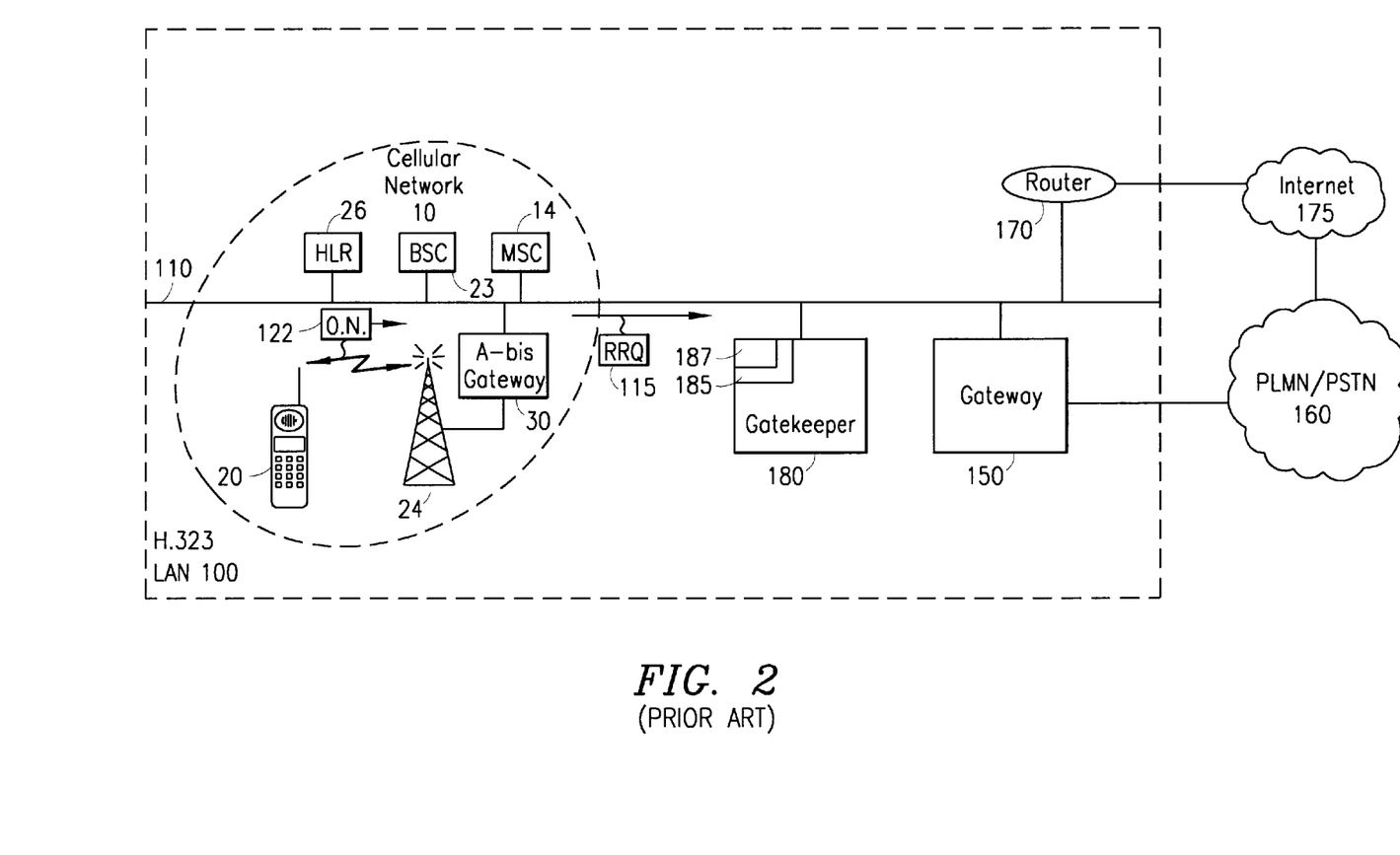
FIG. 2 is a block diagram illustrating a conventional H.323 system implementing a cellular network.

If, however, as shown in FIG. 2 of the drawings, the H.323 endpoint is a Mobile Station (MS) 20, the MS 20 registers with the H.323 system 100 through a cellular system 10 within the H.323 system 100 by providing, for example, an Office Number 122 uniquely identifying the mobile subscriber. The cellular system includes a Mobile Switching Center (MSC) 14 for handling mobility management and controlling calls made to and from MSs 20 within the H.323 system 100, a Base Station Controller (BSC) 23 for controlling radio-related functions, such as channel assignment, and at least one A-bis Gateway 30 and associated Base Transceiver Station (BTS) 24, all of which are connected to the LAN backbone 110. It should be noted that the BTS 24 is connected to the LAN backbone 110 via the A-bis Gateway 30.

The A-bis Gateway 30 converts between the circuit-switched signaling and data transport used by the BTS 24 and the packet-switched signaling and data transport used by the H.323 system 100. The BTS 24 operates as a transceiver for transmitting and receiving data and control messages to and from the MS -20 over an air interface. It should also be noted that the MSC 14 and BSC 23 can be separate nodes or can be integrated together in one node.

Most of the permanent H.323 subscriber information is stored within the Gatekeeper 180. Therefore, when an MS 20 wants to register with the H.323 system 100, e.g., when the MS 20 powers on, the MS 20 transmits a location update message, including the Office Number 122, to the BTS 24, which forwards the location update message and Office Number to the A-bis Gateway 30. The A-bis Gateway 30 converts the location update message, including the Office Number 122, into an Internet Protocol (IP) packet 120 for transmission to the MSC 14 via BSC 23. The MSC 14, in turn, transmits an H.225 Registration Request (RRQ) message 115, which includes a subscriber number and other alias' of the Office Number 122, such as an e-mail address, to the Gatekeeper 180 over the LAN backbone 110.

Thereafter, the Gatekeeper 180 stores routing information 187, e.g., the IP address for the MSC 14 and an associated port number for the MS 20, for the MS 20 within a subscriber record or database 185 within the Gatekeeper 180. It should be understood that although each MS 20 associated with the MSC 14 is registered individually with the Gatekeeper 180, the MSC 14 itself is considered to be an H.323 endpoint. Therefore, in the H.323 architecture, there are multiple sub-endpoints (MSs 20), controlled by one main endpoint (MSC 14).

If one of the MSs 20 roams outside of the H.323 system 100, for example, into the PLMN, calls to that MS 20 will still be routed to the MSC 14 within the H.323 system 100. When the paging attempts by the MSC 14 fail, the MSC 14 determines that the call cannot be completed to the MS 20. Thereafter, the MSC 14 informs the Gatekeeper 180 that the MS 20 cannot be reached by transmitting a Release Complete message to the Gatekeeper 180.

However, since the MS 20 has simply roamed outside of the H.323 system 100, in order to complete the call, the call must be re-directed to the PLMN. In order to re-direct the call using the current Facility message, the H.225 protocol must be adapted to include the Mobile Station Integrated Services Digital Network (MSISDN) number for the MS 20 in the Facility message from the MSC 14 to the Gatekeeper 180. However, storing the MSISDN of each MS 20 within the MSC 14 within the H.323 system 100 is not an efficient solution.

Figure 3:
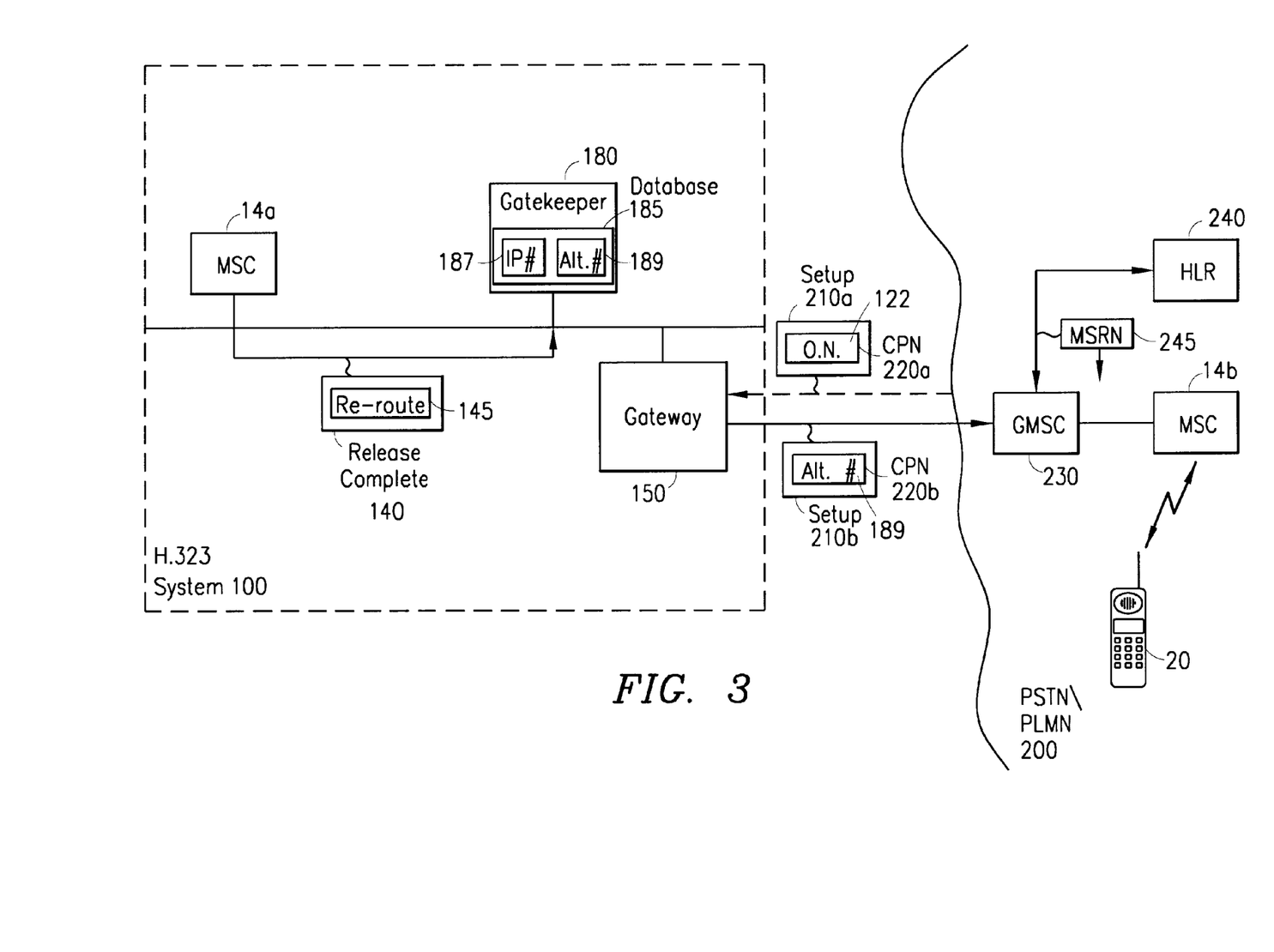
FIG. 3 is a block diagram illustrating re-routing a call to a Mobile Station (MS) that has roamed outside of an H.323 system in accordance with embodiments of the present invention.

Therefore, in accordance with embodiments of the present invention, as shown in FIG. 3 of the drawings, when an MS 20 roams into another network, such as the PLMN 200, and a call to the MS 20 is received by the MSC 14a within the H.323 system 100, instead of sending a Facility message to the Gatekeeper 180, a unique release cause 145 for re-routing calls can be sent in a Release Complete message 140 to the Gatekeeper 180. This release cause 145 could be, for example, "re-route call to alternative number."

At reception of this re-routing cause 145 in the Release Complete message 140, the Gatekeeper 180 can access the subscriber record or database 185 within the Gatekeeper 180 to retrieve an alternative number 189 for the MS 20, and establish a new call connection to the alternative number 189. Alternatively, the alternative number 189 can be stored within a database 185 outside of, but accessible by, the Gatekeeper 180. Normally, the alternative number 189 for MSs 20 would be the MSISDN for the MS 20. It should be noted that the Gatekeeper 180 currently already has the capability to store the MSISDN for the MS 20.

Figure 4:
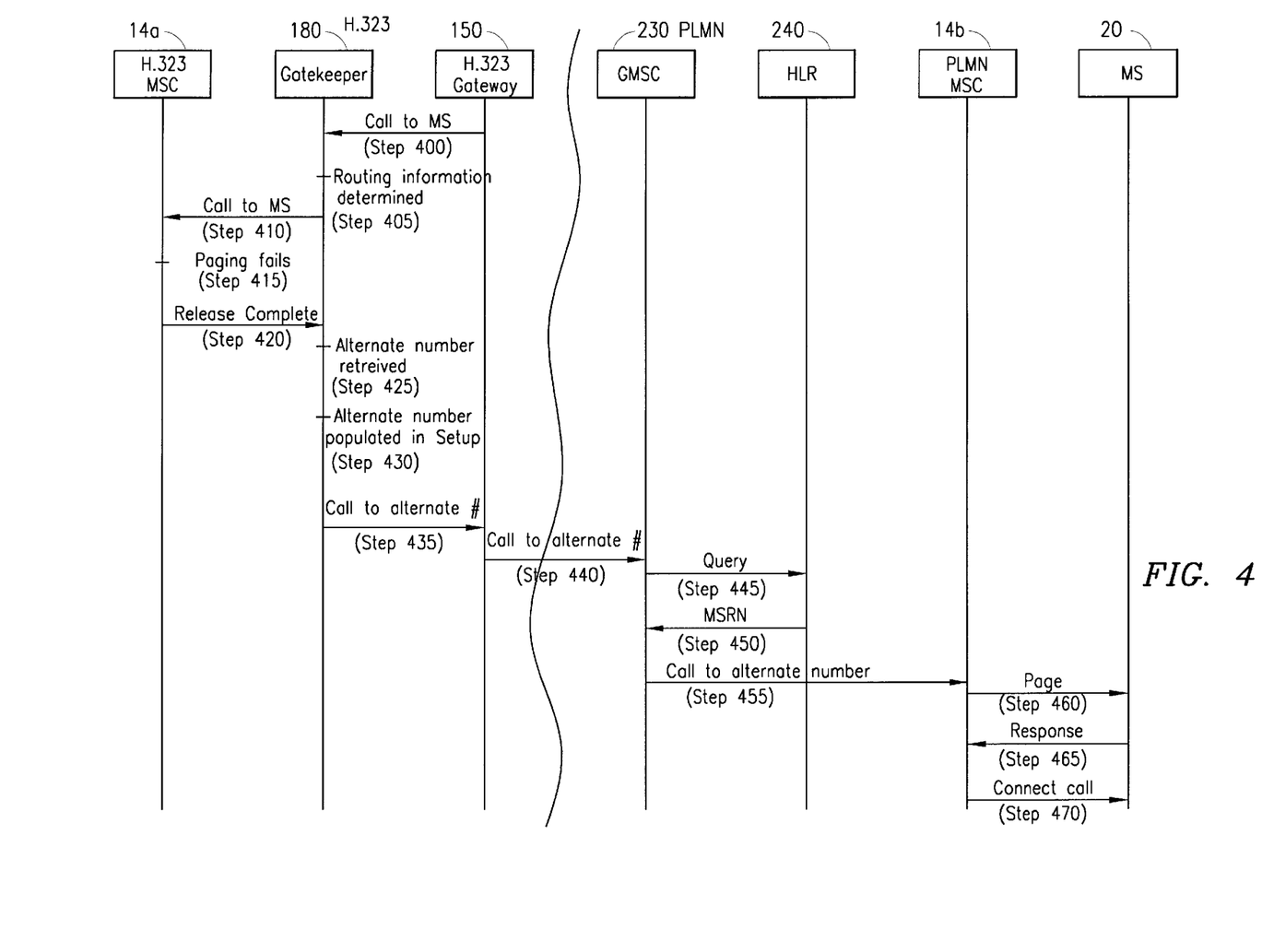
FIG. 4 is a signaling diagram illustrating the signaling involved in the re-routing process shown in FIG. 3 of the drawings.

With reference now to the signaling diagram shown in FIG. 4 of the drawings, which will be described in connection with FIG. 3 of the drawings, when the original call to the MS 20 comes into the Gatekeeper 180 via the Gateway 150 or from another H.323 endpoint (step 400), the former being shown, the Gatekeeper 180 accesses the subscriber record 185 associated with the called MS 20 to determine the IP address and port number 187 for the called MS 20 (step 405). If the call originates from outside of the H.323 system 100, as is shown, the call comes into the Gateway 150 as a Setup message 210, such as an Initial Address Message (IAM), having the Office Number 122 associated with both the Gatekeeper 180 and the MS 20 as a Called Party Number (CPN) parameter 220a. The Gatekeeper 180 uses this Office Number 122 to determine the IP address and port number 187 for the MS 20. Thereafter, the Gatekeeper 180 routes the call to the MSC 14a within the H.323 system 100 associated with that IP address 187 (step 410). After paging attempts fail (step 415), the MSC 14a sends the Release Complete message 140 with the re-routing cause 145 back to the Gatekeeper 180 (step 420).

When the Gatekeeper 180 retrieves the alternative number 189 for the MS 20 from the subscriber record 185 (step 425), the Gatekeeper 180 formulates an additional Setup message 210b with the MSISDN 189 as the CPN parameter 220b (step 430). This Setup message 210b is forwarded to the Gateway 150 within the H.323 system 100 (step 435), and then to a Gateway Mobile Switching Center (GMSC) 230 within the PLMN 200 (step 440). The GMSC 230 queries a Home Location Register (HLR) 240 associated with the MS 20 (step 445) to retrieve routing information 245 for the MS 20 (step 450). It should be understood that the HLR stores 240 routing information 245 for the MS 20 and non-H.323 subscriber information, and can be located within the PLMN 200 or within the H.323 system 100.

After the GMSC 230 receives the routing information 245, e.g., a Mobile Station Roaming Number (MSRN), which is a temporary number used for routing the call to a Mobile Switching Center (MSC) 14b within the PLMN 200 currently serving the MS 20, the GMSC 230 forwards the call to the MSC 14b indicated by the MSRN 245 (step 455). Thereafter, the MSC 14b pages the MS 20 (step 460), and upon receiving a response to the page (step 465), connects the call to the MS 20 (step 470). It should be understood that the alternative number 189 can be another IP address and port number associated with another H.323 endpoint or a directory number associated with another terminal within the PSTN/PLMN, instead of the MSISDN associated with the MS 20.

Figure 5:
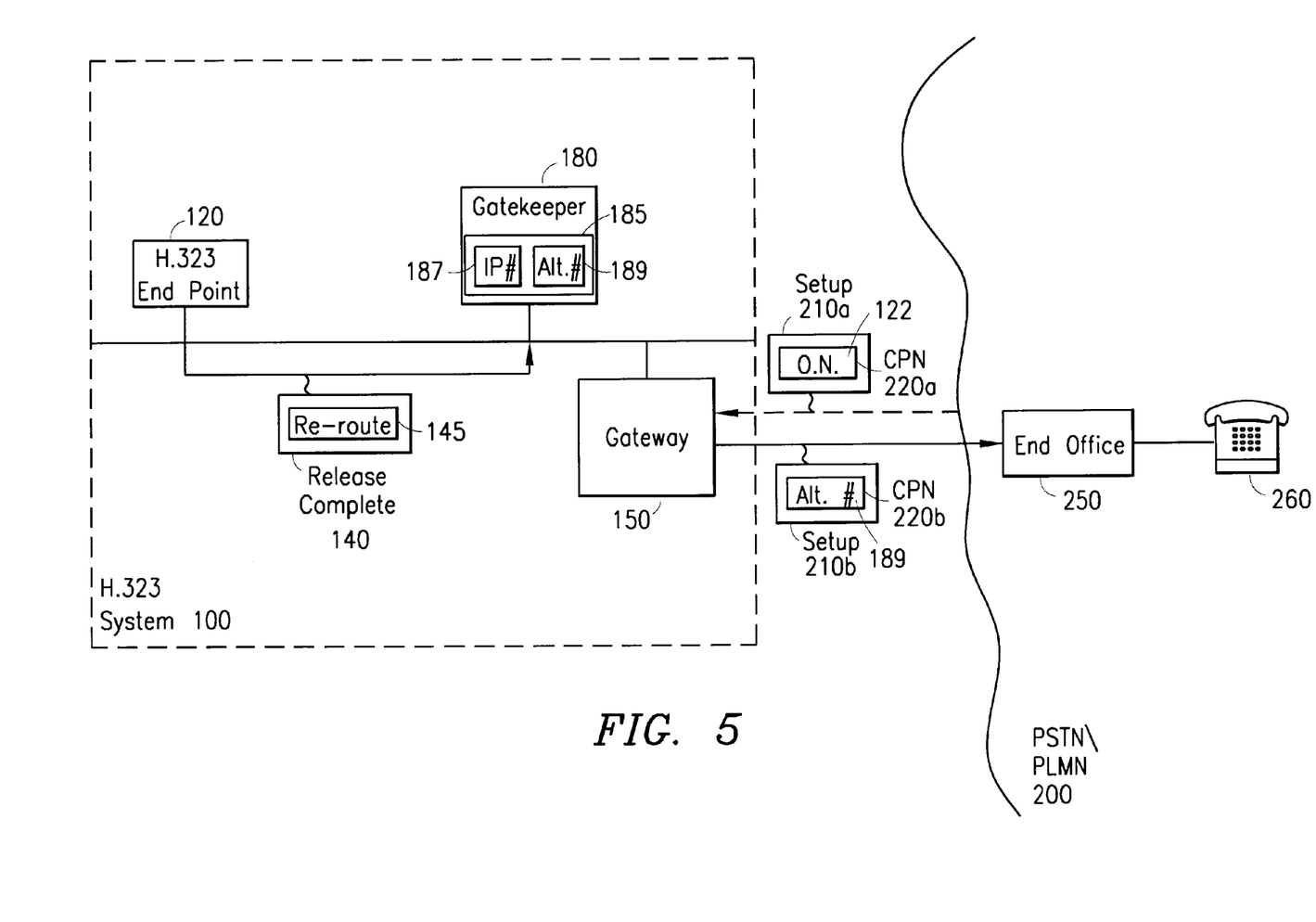
FIG. 5 is a block diagram illustrating re-routing a call to an H.323 subscriber from an H.323 endpoint to a terminal outside of the H.323 system in accordance with embodiments of the present invention.

This re-routing system and method can- also be implemented for H.323 endpoints within the H.323 system that would like to have calls re-routed to alternative numbers. For example, as shown in FIG. 5 of the drawings, an H.323 subscriber that has registered with the Gatekeeper 180 at a particular H.323 endpoint 120 (computer or IP telephone) may want to have calls not answered at the H.323 endpoint 120 to be re-routed to another number 189. This feature is similar to the existing call forwarding feature within the PSTN/PLMN 200. However, the implementation of the H.323 re-routing feature differs from the implementation of the PSTN/PLMN call forwarding feature in that the H.323 re-routing feature requires the H.323 endpoint 120 to send the re-routing cause 145 within the Release Complete message 140 to the Gatekeeper 180 in order to re-route the call to the alternative number 189 stored in the database 185 within the Gatekeeper 180.

Figure 6:
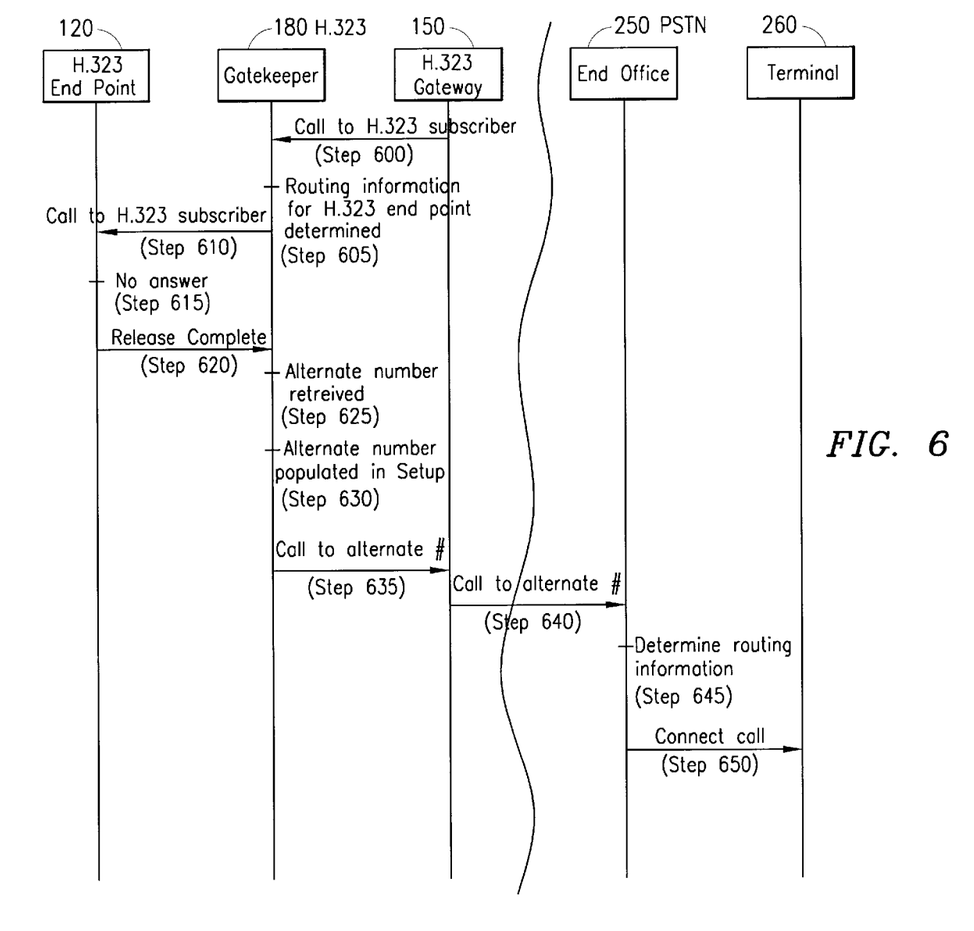
FIG. 6 is a signaling diagram illustrating the signaling involved in the re-routing process shown in FIG. 5 of the drawings.

For example, with reference now to the signaling diagram shown in FIG. 6 of the drawings, when the Gatekeeper 180 receives a call to the H.323 subscriber from the Gateway 150 or from another H.323 subscriber (not shown) (step 600), the former being illustrated, the Gatekeeper 180 accesses the subscriber record 185 for the H.323 subscriber to determine the IP address and port number 187 for the H.323 endpoint 120 that the called H.323 subscriber is currently registered on (step 605). Thereafter, the Gatekeeper 180 routes the call to that H.323 endpoint 120 (step 610).

In response to initiating a ringing tone on the H.323 endpoint 120, if the H.323 subscriber does not answer the call (step 615), the H.323 endpoint 120 transmits the Release Complete message 140 with the re-routing cause 145 back to the Gatekeeper 180 (step 620). If an alternative number 189 is stored within the subscriber record 185 associated with the called H.323 subscriber, the Gatekeeper 180 retrieves this alternative number 189 (step 625). This alternative number 189 could be another IP address for another H.323 endpoint within the H.323 system 100. Alternatively, as is shown, the alternative number 189 can be a number associated with a terminal 260 within the PSTN/PLMN 200. In this case, the Gatekeeper 180 populates the alternative number 189 in the CPN parameter 220b of the Setup message 210b (step 630) and transmits the Setup message 210b to the Gateway 150 (step 635), which in turn, transmits the Setup message 210b to a switch or end office 250 within the PSTN 200 (step 640). The end office 250 retrieves the alternative number 189 from the Setup message 210b, determines routing information for the call based upon the alternative number 189 (step 645) and routes the call to the terminal 260 associated with the alternative number 189 to complete the call (step 650). It should be understood that normal call terminating features (call forwarding, caller ID, call waiting, etc.) can be applied by the end office 250 to the call.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for re-routing a call to an H.323 subscriber within an H.323 system, comprising:

an H.323 endpoint within said H.323 system for receiving said call to said H.323 subscriber and transmitting a Release Complete message including a re-routing cause indicating said call should be re-routed to an alternative number for said H.323 subscriber in response to said call not being answered at said H.323 endpoint;

a database for storing said alternative number for said H.323 subscriber; and a Gatekeeper within said H.323 system for receiving said Release Complete message including said re-routing cause from said H.323 endpoint, accessing said database to retrieve said alternative number in response to receipt of said re-routing cause and re-routing said call to said alternative number to complete said call.

2. The telecommunications system of claim 1, wherein said H.323 endpoint includes a mobile switching center previously in wireless communication with a mobile station.

3. The telecommunications system of claim 2, wherein said mobile switching center sends a page directed to said mobile station in response to receipt of said call, said mobile switching center transmitting said Release Complete message including said re-routing cause to said Gatekeeper in response to said mobile station not responding to said page.

4. The telecommunications system of claim 2, wherein said alternative number is a mobile station integrated services digital network number associated with said mobile station, said mobile station currently being located within a public land mobile network.

5. The telecommunications system of claim 4, further comprising:

a gateway within said H.323 system for receiving said call to said mobile station integrated services digital network number from said Gatekeeper and routing said call to said mobile station currently located within said public land mobile network.

6. The telecommunications system of claim 5, further comprising:

a gateway mobile switching center within said public land mobile network for receiving said call to said mobile station from said gateway, determining routing information for said call and routing said call to said mobile station using said routing information.

7. The telecommunications system of claim 1, wherein said database is a subscriber record within said Gatekeeper.

8. The telecommunications system of claim 1, wherein said H.323 endpoint is a computer or an internet protocol telephone.

9. The telecommunications system of claim 1, wherein said alternative number includes at least an internet protocol address for an additional H.323 endpoint.

10. A method for re-routing a call to an H.323 subscriber, comprising the steps of:

receiving said call to said H.323 subscriber at a Gatekeeper within an H.323 system associated with said H.323 subscriber;

routing said call from said Gatekeeper to an H.323 endpoint associated with said H.323 subscriber;

in response to failure of said H.323 subscriber to answer said call at said H.323 endpoint, receiving a Release Complete message including a re-routing cause indicating said call should be re-routed to an alternative number for said H.323 subscriber at said Gatekeeper;

in response to receipt of said Release Complete message including said re-routing cause, accessing a database, by said Gatekeeper, to retrieve said alternative number for said H.323 subscriber; and re-routing said call from said Gatekeeper to said alternative number to complete said call.

11. The method of claim 10, wherein said alternative number is a mobile station integrated services digital network number associated with a mobile station, said mobile station currently being located within a public land mobile network, said step of re-routing further comprising the steps of:

routing said call from said Gatekeeper to a gateway within said H.323 system; and routing said call from said gateway to said mobile station currently located within said public land mobile network using said mobile station integrated service digital network number.

12. The method of claim 11, wherein said step of routing said call to said mobile station further comprises the steps of:

routing said call from said gateway to a gateway mobile switching center within said public land mobile network;

determining routing information for said call; and routing said call from said gateway mobile switching center to said mobile station using said routing information.

13. The method of claim 10, wherein said alternative number includes at least an internet protocol address for an additional H.323 endpoint, said step of re-routing further comprising the step of:

routing said call from said Gatekeeper to said additional H.323 endpoint using said internet protocol address.

14. The method of claim 10, wherein said alternative number is a directory number for a terminal within a Public Switched Telephone Network, said step of re-routing further comprising the steps of:

routing said call from said Gatekeeper to a gateway within said H.323 system; and routing said call from said gateway to said terminal within said Public Switched Telephone Network using said directory number.

15. The method of claim 14, wherein said step of routing said call to said terminal further comprises the steps of:

routing said call from said gateway to a switch within said Public Switched Telephone Network;

determining routing information for said terminal; and routing said call from said switch to said terminal using said routing information.

16. The method of claim 10, wherein said step of receiving said call further comprises the step of:

receiving an initial address message having a called party number parameter therein, said called party number parameter including an office number associated with said Gatekeeper and said H.323 subscriber at said Gatekeeper.

17. The method of claim 16, wherein said step of re-routing said call further comprises the step of:

creating an additional initial address message having said alternative number in said called party number parameter.

18. A method for indicating that a call to an H.323 subscriber within an H.323 system should be re-routed, comprising the steps of: receiving said call to said H.323 subscriber at an H.323 endpoint associated with said H.323 subscriber;

determining whether said call can be completed to said H.323 subscriber at said H.323 endpoint; and in response to said call not being completed to said H.323 subscriber at said H.323 endpoint, transmitting a Release Complete message including a re-routing cause from said H.323 endpoint to a Gatekeeper within said H.323 system, said re-routing cause indicating that said call should be re-routed to an alternative number associated with said H.323 subscriber to complete said call.

19. The method of claim 18, wherein said H.323 endpoint includes a mobile switching center previously in wireless communication with a mobile station associated with said H.323 subscriber, said step of determining further comprising the steps of:

sending a page from said mobile switching center to said mobile station in response to receipt of said call; and if said mobile station does not respond to said page, determining that said call cannot be completed to said H.323 subscriber.

20. The method of claim 18, wherein said step of determining further comprises the step of:

initiating a ringing tone on said H.323 endpoint to signal said H.323 subscriber to answer said call; and if, in response to said ringing tone, said H.323 subscriber does not answer said call on said H.323 endpoint, determining that said call cannot be completed to said H.323 subscriber at said H.323 endpoint.

* * * * *